United States Patent
Kaidu (10) Patent No.: US 9,960,717 B2
(45) Date of Patent: May 1, 2018

(54) MOTOR DRIVE CONTROL DEVICE (71) Applicant: MINEBEA CO., LTD., Kitasaku-gun, Nagano (JP)

(72) Inventor: Hiroyuki Kaidu, Iwata (JP)

(73) Assignee: Minebea Co., Ltd., Nagano (JP)

( * ) Notice: Subject to any disclaimer, the term of this patent is extended or adjusted under 35 U.S.C. 154(b) by 0 days. days.

(21) Appl. No.: 15/359,282

(22) Filed: Nov. 22, 2016

(65) Prior Publication Data
US 2017/0155346 A1 Jun. 1, 2017

(30) Foreign Application Priority Data
Nov. 27, 2015 (JP) .................................. 2015-231982

(51) Int. Cl.
| | |
|---|---|
| H02P 7/00 | (2016.01) |
| H02P 23/12 | (2006.01) |
| H02P 3/00 | (2006.01) |
| H02P 6/17 | (2016.01) |
| H02P 29/10 | (2016.01) |
| H02P 27/06 | (2006.01) |
| H02P 6/182 | (2016.01) |
| H02P 6/20 | (2016.01) |

(52) U.S. Cl.
CPC ............... *H02P 6/17* (2016.02); *H02P 6/182* (2013.01); *H02P 6/20* (2013.01); *H02P 27/06* (2013.01); *H02P 29/10* (2016.02)

(58) Field of Classification Search
CPC .......... H02P 6/153; H02P 6/182; H02P 6/157; H02P 27/06; H02P 6/17; H02P 29/10
USPC .................... 318/400.14, 440, 459
See application file for complete search history.

(56) References Cited

U.S. PATENT DOCUMENTS

| | | | | |
|---|---|---|---|---|
| 2003/0234629 A1 | 12/2003 | Trifilo | | |
| 2006/0170383 A1* | 8/2006 | Narumi | ................... | H02P 6/182 318/400.04 |
| 2008/0252240 A1* | 10/2008 | Sugie | ........................ | H02P 6/15 318/400.06 |
| 2009/0153086 A1* | 6/2009 | Narumi | ..................... | H02P 6/18 318/400.35 |
| 2014/0210379 A1* | 7/2014 | Kato | ........................ | H02P 6/15 318/139 |

(Continued)

FOREIGN PATENT DOCUMENTS

| | | |
|---|---|---|
| JP | 2000-295890 A | 10/2000 |
| JP | 2004-112939 A | 4/2004 |
| JP | 2008-301550 A | 12/2008 |

*Primary Examiner* — Eduardo Colon Santana
*Assistant Examiner* — Gabriel Agared
(74) *Attorney, Agent, or Firm* — Carrier Blackman & Associates, P.C.; Joseph P. Carrier; Jeffrey T. Gedeon (57) ABSTRACT

A motor drive control device, which drives a motor including a plurality of phase coils and a rotor, includes: a motor driver, which outputs a drive signal to the phase coils on a drive control signal; one position sensor, which is provided in a position where a timing of at least one of a rising edge and a falling edge of a rotor position signal is near a zero cross timing of a phase signal of any phase coil; and a controller that: generates the drive control signal based on the phase signal in a case where a rotational speed of the motor is less than a predetermined rotational speed; and generates the drive control signal based on the rotor position signal output from the one position sensor in a case where the rotational speed is equal to or more than the predetermined rotational speed.

5 Claims, 9 Drawing Sheets

(56) References Cited

U.S. PATENT DOCUMENTS

2015/0002061 A1* 1/2015 Hatakeyama ............ H02P 6/18
                                                    318/400.06
2015/0318808 A1* 11/2015 Okubo ................... H02K 29/03
                                                    318/400.02

* cited by examiner

MOTOR DRIVE CONTROL DEVICE

CROSS-REFERENCE TO RELATED APPLICATION

This application claims priority from Japanese Patent Application No. 2015-231982 filed on Nov. 27, 2015, the entire subject matter of which is incorporated herein by reference.

TECHNICAL FIELD

This disclosure relates to a motor drive control device.

BACKGROUND

In a motor driving control system used to a DC brushless motor, there are widely used two systems of a sensor driving system which uses a position sensor such as a hall sensor and a sensorless driving system which generates rotor position information from an induced voltage generated in a motor coil. A motor drive control device not provided with the position sensor generates a phase signal (pulse signal) by comparing between the induced voltage which emerges at the motor terminal in an open section (non-energization phase) and a reference voltage (equivalent neutral point electrical potential) with a comparator, and detects a rotational position of the rotor based on the phase signal.

A motor driving device is disclosed in JP-A-2008-301550 which outputs a drive selection signal for activating a motor by sensor driving and switching the motor to sensorless driving when the number of revolutions increases, and in which a drive switching unit continues the sensor driving even after the sensorless driving is selected and switches the excitation sequence to the sensorless driving while avoiding a shift period defined between an edge of the sensor signal and an edge of a zero-cross signal to be used as a reference instead of the edge of the sensor signal.

SUMMARY

However, in three-phase sensorless driving, the motor control device disclosed in JP-A-2008-301550 has a problem that when a zero-cross reference voltage and the phase voltage come to be a non-cross state, a step-out occurs. For example, the step-out is likely to occur at the time of high-speed rotation of about 30000 revolutions per one minute.

Such a problem can be avoided by lowering the zero-cross reference voltage and advancing the angle. However, when the zero-cross reference voltage is lowered, a problem such as a start-up hardly occurs or the low-speed rotation is hardly maintained occurs.

This disclosure is to provide a motor drive control device, in which it is possible to normally start up and realize a low-speed rotation, and the step-out hardly occurs even in a high-speed rotation.

A motor drive control device of this disclosure drives a motor including a plurality of phase coils and a rotor rotatably supported with respect to the plurality of phase coils, and the motor drive control device includes: a motor driver, which outputs a drive signal to each of the phase coils of the motor based on a drive control signal; one position sensor, which is provided in a position where a timing of at least one of a rising edge and a falling edge of a rotor position signal is a zero cross timing of a phase signal of any phase coil; and a controller that: generates the drive control signal based on the phase signal of the any phase coil in a case where a rotational speed of the motor is less than a predetermined rotational speed; and generates the drive control signal based on the rotor position signal output from the one position sensor in a case where the rotational speed is equal to or more than the predetermined rotational speed. Other units will be described in the embodiments.

According to this disclosure, it is possible to provide the motor drive control device, in which it is possible to normally start up and realize a low-speed rotation, and the step-out hardly occurs even in a high-speed rotation.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, embodiments of this disclosure will be described in detail with reference to drawings.

First Embodiment

Figure 1:
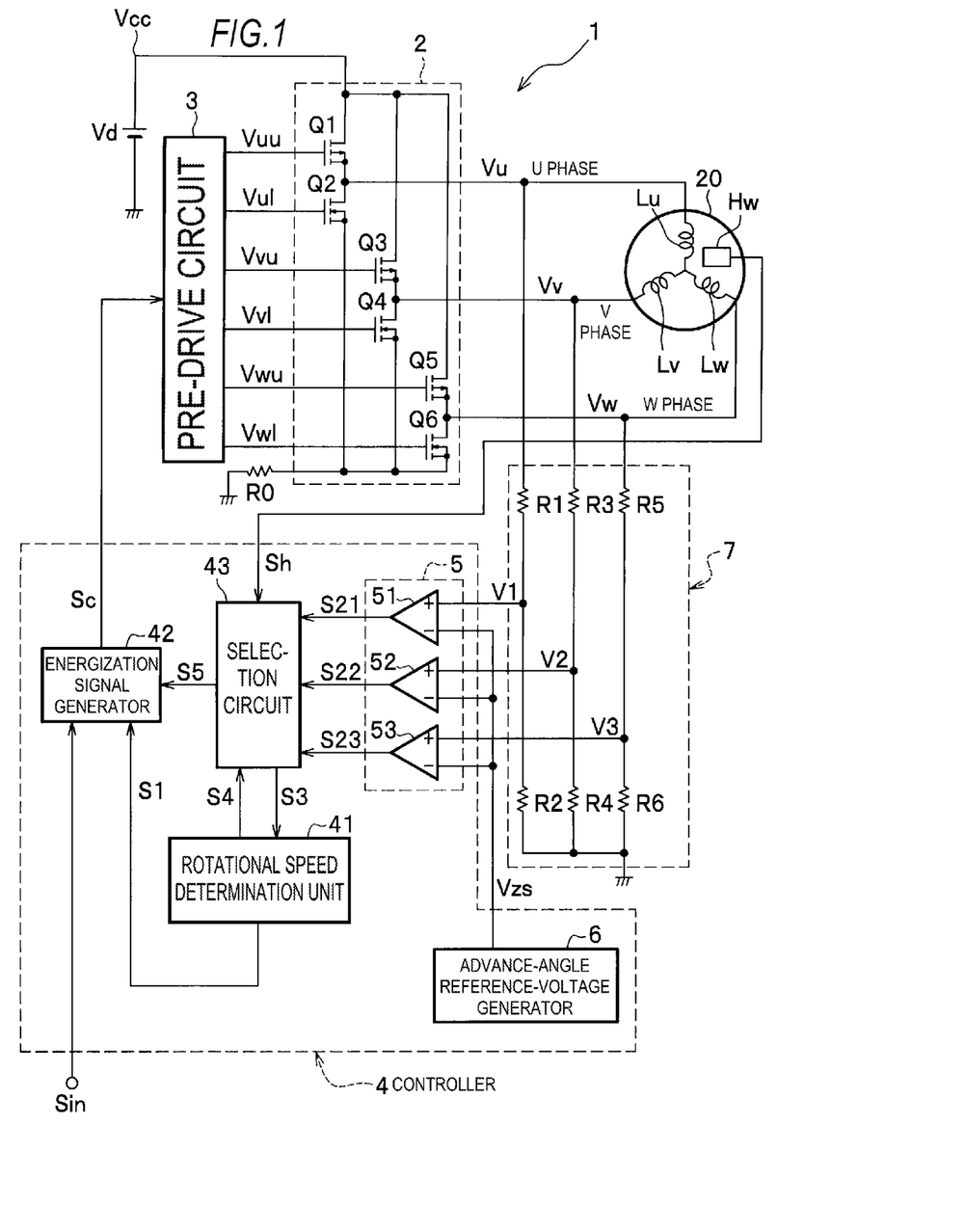
FIG. 1 is a block diagram illustrating a circuit configuration of a motor drive control device according to a first embodiment.

FIG. 1 is a block diagram illustrating a circuit configuration of a drive control device 1 of a motor 20 according to a first embodiment.

As illustrated in FIG. 1, the motor 20 according to the embodiment is a three-phase brushless DC motor and includes coils Lu, Lv, and Lw of phases and a rotor (not illustrated). One ends of the coils Lu, Lv, and Lw are formed in Y-connection. The other end of the coil Lu is connected to a U phase, the other end of the coil Lv is connected to a V phase, and the other end of the coil Lw is connected to a W phase. A three-phase AC is input to the U phase, the V phase, and the W phase from an inverter circuit 2, whereby the motor 20 is driven to rotate.

The motor 20 is provided with one hall sensor Hw (an example of a position sensor) formed of a magnetic sensor, and outputs a hall signal Sh (rotor position signal). One hall sensor Hw is provided in a position where the timing of the rising edge or the falling edge of the hall signal Sh (rotor position signal) is near a zero cross timing of a phase signal of any phase. Accordingly, sensorless driving and one-sensor driving, which is driving the motor 20 based on the hall signal Sh of the one hall sensor Hw, can be controlled according to the control flow of the same firmware.

The drive control device 1 of the motor 20 (an example of a motor drive control device) includes an inverter circuit 2 that drives the motor 20 and a pre-drive circuit 3 (an example of a motor driver). The drive control device 1 further includes a back electromotive voltage detector 7 and a controller that output a drive control signal Sc (to be described below) to the motor driver.

The drive control device 1 is connected to a DC power source Vd, and is connected to the motor 20 through three phases of a U-phase wiring, a V-phase wiring, and a W-phase wiring. The drive control device 1 applies a driving voltage to the motor 20 to control the rotation of the motor 20. An inter-terminal voltage Vu is applied to the U phase. An inter-terminal voltage Vv is applied to the V phase. An inter-terminal voltage Vw is applied to the W phase.

The motor driver is configured by the inverter circuit 2 and the pre-drive circuit 3. The DC power source Vd applies a power supply voltage Vcc to the motor driver, thereby supplying power thereto. The motor driver receives the power from the DC power source Vd and supplies a drive current to the U-phase coil Lu, the V-phase Lv, and the W-phase coil Lw of the motor 20 based on the drive control signal Sc supplied from the controller 4, thereby rotating the rotor. The motor driver drives the motor 20 using a sinusoidal wave driving system.

The inverter circuit 2 (a part of the motor driver) is connected to the DC power source Vd and receives the supply of power. The inverter circuit 2 is connected to the pre-drive circuit 3 (a part of the motor driver) and the phase coils Lu, Lv, and Lw included in the motor 20. The inverter circuit 2 applies a current to the phase coils Lu, Lv, and Lw of the motor 20 based on drive signals Vuu to Vw1 of the pre-drive circuit 3.

The inverter circuit 2 includes a U-phase switching leg in which switching elements Q1 and Q2 are connected to each other in series, a V-phase switching leg in which switching elements Q3 and Q4 are connected to each other in series, and a W-phase switching leg in which switching elements Q5 and Q6 are connected to each other in series. For example, these switching elements Q1 to Q6 are field effect transistors (FET). The inverter circuit 2 is connected to the DC power source Vd and is further connected to a resistor R0.

The U-phase switching leg includes the upper-arm-side switching element Q1 and the lower-arm-side switching element Q2. A drain terminal of the switching element Q1 is connected to a positive electrode of the DC power source Vd. A source terminal of the switching element Q1 outputs an AC signal of the U phase and is connected to a drain terminal of the switching element Q2. A source terminal of the switching element Q2 is connected to the ground (a negative electrode of the DC power source Vd) through the resistor R0. A gate terminal of the switching element Q1 and a gate terminal of the switching element Q2 are respectively connected to the pre-drive circuit 3.

The V-phase switching leg includes the upper-arm-side switching element Q3 and the lower-arm-side switching element Q4. A drain terminal of the switching element Q3 is connected to the positive electrode of the DC power source Vd. A source terminal of the switching element Q3 outputs an AC signal of the V phase and is connected to a drain terminal of the switching element Q4. A source terminal of the switching element Q4 is connected to the ground (the negative electrode of the DC power source Vd) through the resistor R0. A gate terminal of the switching element Q3 and a gate terminal of the switching element Q4 are respectively connected to the pre-drive circuit 3.

The W-phase switching leg includes the upper-arm-side switching element Q5 and the lower-arm-side switching element Q6. A drain terminal of the switching element Q5 is connected to the positive electrode of the DC power source Vd. A source terminal of the switching element Q5 outputs an AC signal of the W phase and is connected to a drain terminal of the switching element Q6. A source terminal of the switching element Q6 is connected to the ground (the negative electrode of the DC power source Vd) through the resistor R0. A gate terminal of the switching element Q5 and a gate terminal of the switching element Q6 are respectively connected to the pre-drive circuit 3.

That is, the inverter circuit 2 includes: the upper-arm-side switching elements Q1, Q3, and Q5 respectively connected between the phase coils Lu, Lv, and Lw of the motor 20 and one terminal (positive-electrode terminal) of the DC power source Vd; and the lower-arm-side switching elements Q2, Q4, and Q6 respectively connected between the phase coils Lu, Lv, and Lw and the other terminal (negative-electrode terminal) of the DC power source Vd through the resistor R0.

When power is supplied from the DC power source Vd, and the drive signals Vuu to Vw1 are input from the pre-drive circuit 3, the inverter circuit 2 causes three-phase AC currents to flow into the U-phase wiring, the V-phase wiring, and the W-phase wiring of the motor 20.

The pre-drive circuit 3 (a part of the motor driver) forms the motor driver by a combination of with the inverter circuit 2, which is to be connected, and is connected to the controller 4. The pre-drive circuit 3 includes, for example, six gate drive circuits and generates the drive signals Vuu to Vw1 used for driving the inverter circuit 2.

The back electromotive voltage detector 7 is connected to the phase coils. The back electromotive voltage detector 7 includes resistive voltage dividing circuits, and detects a rotational position of the rotor for sensorless driving The controller 4 generates the drive control signal Sc based on the phase signal of the each phase coils in a case where a rotational speed is less than a predetermined rotational speed, and generates the drive control signal Sc based on the hall signal Sh (rotor position signal) output from the one hall sensor Hw in a case where the rotational speed is equal to or more than the predetermined rotational speed.

The controller 4 includes an advance-angle reference-voltage generator 6 which generates a zero-cross reference voltage Vzs, a back-electromotive-voltage comparator 5 which generates phase signals S21 to S23 of the respective phases due to the cross timing of the zero-cross reference voltage Vzs and back electromotive voltage of the each phase coil, a rotational speed determination unit 41 which inputs the phase signals S21 to S23 of the respective phases and outputs rotational speed information S4, an energization signal generator 42 which generates the drive control signal Sc based on a selection signal S5 output from a selection circuit 43, and the selection circuit 43 which switches the selection signal S5 from a position detection signal Sp to the hall signal Sh in a case where a rotational speed is equal to or more than the predetermined rotational speed, based on the rotational speed information S4. The controller 4 is included in a microcomputer. Each part may be realized by software, and the function may be virtually represented.

The back-electromotive-voltage comparator 5 generates the phase signal of the each phase due to the cross timing of the zero-cross reference voltage Vzs and the back electromotive voltages of the each phase coil.

The back-electromotive-voltage comparator 5 includes comparators 51, 52, and 53 of the respective phases. The voltage of a U-phase node is divided by the resistors R1 and R2 of the back electromotive voltage detector 7, and thus the U-phase node is connected to one input terminal of the comparator 51. The voltage of a V-phase node is divided by the resistors R3 and R4 of the back electromotive voltage detector 7, and thus the V-phase node is connected to one input terminal of the comparator 52. The voltage of a W-phase node is divided by the resistors R5 and R6 of the back electromotive voltage detector 7, and thus the W-phase node is connected to one input terminal of the comparator 53.

Herein, for example, in a case where the motor 20 is used as a fan motor, the motor 20 may be rotated by disturbance such as blowing air although a current is not applied to the coils Lu, Lv, and Lw of the motor 20. At such a time, an induced voltage generated in the coils Lu, Lv, and Lw is referred to as an "back electromotive voltage".

The comparator 51 of the back-electromotive-voltage comparator 5 includes a non-inverted input terminal and an inverted input terminal, and an output terminal. When the applied voltage of the non-inverted input terminal is lower than the applied voltage of the inverted input terminal, the comparator 51 outputs an L-level voltage to the output terminal. When the applied voltage of the non-inverted input terminal exceeds the applied voltage of the inverted input terminal, the comparator 51 outputs an H-level voltage to the output terminal.

A phase voltage V1 obtained by dividing the inter-terminal voltage Vu corresponding to an induced voltage of the coil Lu is input to the non-inverted input terminal of the comparator 51. The zero-cross reference voltage Vzs is input to the non-inverted input terminal of the comparator 51. The comparator 51 generates the phase signal S21 by comparing the phase voltage V1 with the zero-cross reference voltage Vzs. When the phase voltage V1 has a negative value in comparison with the zero-cross reference voltage Vzs, the level of the phase signal S21 is L. When the phase voltage V1 has a positive value in comparison with the zero-cross reference voltage Vzs, the level of the phase signal S21 is H.

A phase voltage V2 obtained by dividing the inter-terminal voltage Vv corresponding to an induced voltage of the coil Lv is input to the non-inverted input terminal of the comparator 52. The zero-cross reference voltage Vzs is input to the non-inverted input terminal of the comparator 52. The comparator 52 generates the phase signal S22 by comparing the phase voltage V2 with the zero-cross reference voltage Vzs. When the phase voltage V2 has a negative value in comparison with the zero-cross reference voltage Vzs, the level of the phase signal S22 is L. When the phase voltage V2 has a positive value in comparison with the zero-cross reference voltage Vzs, the level of the phase signal S22 is H.

A phase voltage V3 obtained by dividing the inter-terminal voltage Vw corresponding to an induced voltage of the coil Lw is input to the non-inverted input terminal of the comparator 53. The zero-cross reference voltage Vzs is input to the non-inverted input terminal of the comparator 53. The comparator 53 generates the phase signal S23 by comparing the phase voltage V3 with the zero-cross reference voltage Vzs. When the phase voltage V3 has a negative value in comparison with the zero-cross reference voltage Vzs, the level of the phase signal S23 is L. When the phase voltage V3 has a positive value in comparison with the zero-cross reference voltage Vzs, the level of the phase signal S23 is H.

In this manner, the comparators 51 to 53 of the back-electromotive-voltage comparator 5 can compare the inter-terminal voltages Vu, Vv, and Vw corresponding to the phase voltages V1 to V3 with the zero-cross reference voltage Vzs. The back-electromotive-voltage comparator 5 outputs the generated phase signals S21 to S23 to the selection circuit 43.

The advance-angle reference-voltage generator 6 generates the zero-cross reference voltage Vzs which is a predetermined constant voltage.

The rotational speed determination unit 41 inputs the phase signals of the respective phases, and outputs the rotational speed information S4. When any one of the phase voltages V1 to V3 zero-crosses with the zero-cross reference voltage Vzs, the rotational speed determination unit 41 determines the rotational speed of the motor 20.

The rotational speed determination unit 41 obtains an actual number of revolutions from the phase signal of the each phase coil.

The rotational speed determination unit 41 obtains the predetermined rotational speed for the comparison result between the actual number of revolutions and the number of revolutions, at which switching from a preset phase signal to a rotor position signal is performed.

The energization signal generator 42 generates the drive control signal Sc based on a rotational speed command signal Sin input from outside, a rotational speed determination signal 51 input from the rotational speed determination unit 41, and a selection signal S5 input from the selection circuit 43.

In a case where the rotational speed is equal to or more than the predetermined rotational speed, based on the rotational speed information S4, the selection circuit 43 switches the selection signal S5 from the position detection signal Sp to the hall signal Sh.

Figure 2:
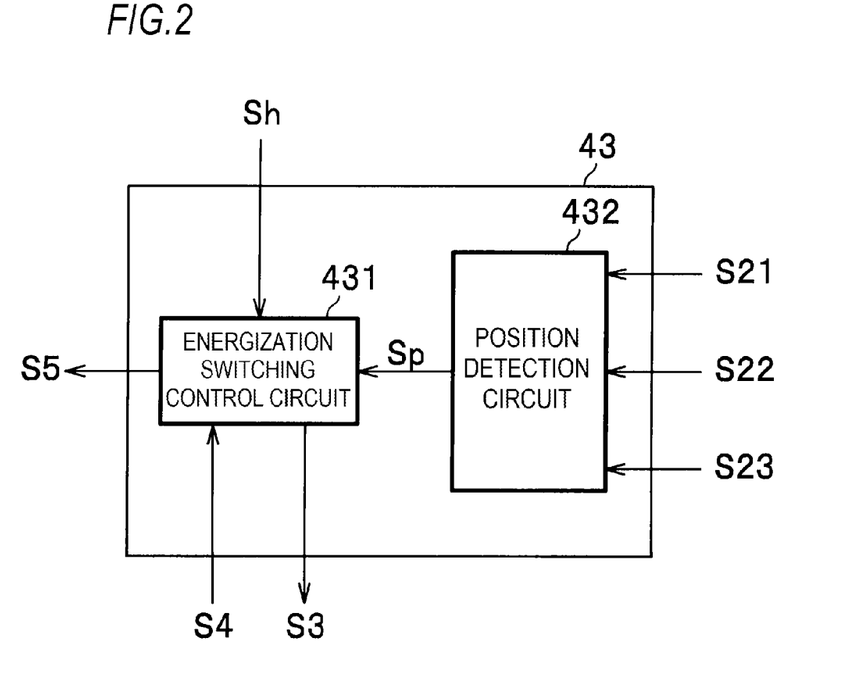
FIG. 2 is a circuit configuration diagram of a selection circuit of a controller of the motor drive control device according to the first embodiment.

FIG. 2 is a circuit configuration diagram of the selection circuit 43.

As illustrated in FIG. 2, the selection circuit 43 includes an energization switching control circuit 431 and a position detection circuit 432.

The energization switching control circuit 431 outputs a position detection signal Sp (the phase signals S21 to S23 of the respective phases), which is output from the position detection circuit 432, as a detection signal S3 to the rotational speed determination unit 41, and obtains the rotational speed information S4 from the rotational speed determination unit 41. In a case where the rotational speed is equal to or more than the predetermined rotational speed, based on the rotational speed information S4, the energization switching control circuit 431 switches the selection signal S5 from the position detection signal Sp to the hall signal Sh of the hall sensor Hw, and outputs the switched signal as the selection signal S5.

Hereinafter, the description will be given about an operation of the above-described drive control device 1 of the motor 20.

First, the basic idea of this disclosure will be described.

In three-phase sensorless driving according to a comparative example, when the zero-cross reference voltage Vzs and the phase voltage fall into a non-cross state during three-phase sensorless driving, there is a risk that a step-out occurs at the time of high-speed rotation. When the zero-cross reference voltage Vzs is lowered and the angle is advanced to avoid the risk, it becomes difficult to start up, or it is not possible to maintain low-speed rotation.

In this disclosure, the one hall sensor Hw is provided in a position near the zero cross timing of the phase signal of any phase and the zero-cross reference voltage Vzs is designed to be a voltage which is easy to start up without a sensor. The start-up is performed by the sensorless driving, in which the position detection signal Sp which is a conduction switching timing calculated from the zero-cross detection timing is used. When the rotor reaches a certain rotational speed, a switching to drive the motor 20 is performed based on the detection signal (hall signal Sh) of the one hall sensor Hw (hereinafter, referred to as the one-sensor driving). Therefore, the start-up is normally performed, and the step-out does not occur even in the high-speed rotation. Hereinafter, the specific description will be given.

Figure 3:
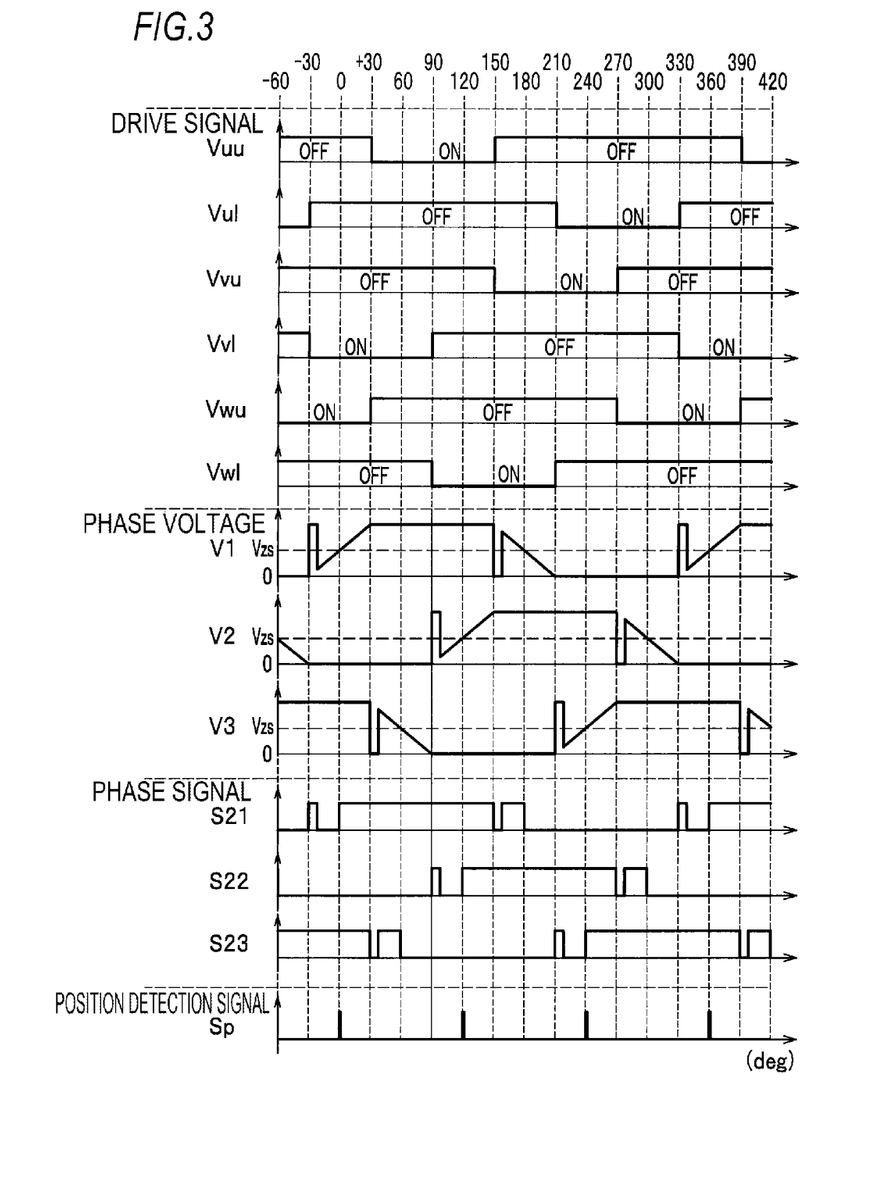
FIG. 3 is a timing chart illustrating an operation waveform of each part of the motor drive control device according to the first embodiment.

FIG. 3 is a timing chart illustrating an operation waveform of each part of the drive control device 1. For explanation, FIG. 3 illustrates an operation when advance angle adjustment on the zero-cross reference voltage Vzs is not performed.

Figure 4:
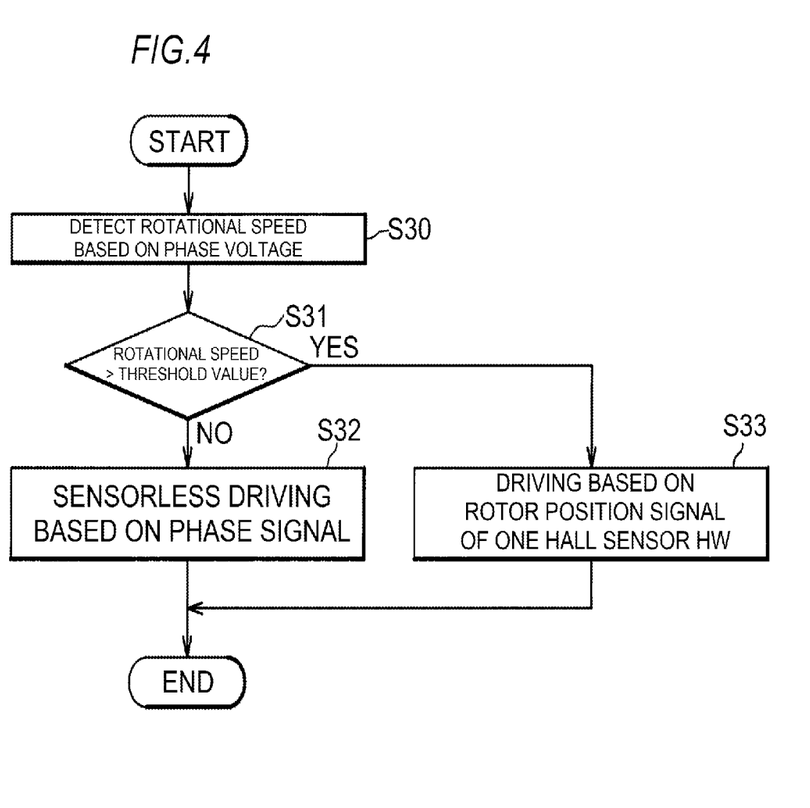
FIG. 4 is a flowchart illustrating control to switch between a position detection signal of sensorless driving and a hall signal of one hall sensor depending on a rotational speed of the motor drive control device according to the first embodiment.

In FIG. 4, respective graphs illustrate, from the top, waveforms of the drive signals Vuu to Vw1, the phase voltages V1 to V3, the phase signals S21 to S23, and the position detection signal Sp.

<Drive Signal>

The drive signal Vuu turns on the switching element Q1 at about 30 degrees, and turns off at about 150 degrees.

The drive signal Vu1 turns off the switching element Q2 at about −30 degrees, turns on at about 210 degrees, and turns off at about 330 degrees.

By turning-off of the drive signal Vu1 at about −30 degrees, the U phase is opened from the ground. A positive spike voltage is generated in the phase voltage V1. Thereafter, the phase voltage V1 rises to match with the zero-cross reference voltage Vzs at about 0 degrees, and is saturated at about 30 degrees.

By turning-on of the drive signal Vuu at about 30 degrees, the power supply voltage Vcc of the DC power source Vd is applied to the U-phase. The phase voltage V1 matches with the power supply voltage Vcc.

By turning-off of the drive signal Vuu at about 150 degrees, the U phase is opened from the positive electrode of the DC power source Vd. A negative spike voltage is generated in the phase voltage V1. Thereafter, the phase voltage V1 descends to match with the zero-cross reference voltage Vzs at about 180 degrees, and reaches 0 V at about 210 degrees.

By turning-on of the drive signal Vu1 at about 210 degrees, the U phase is electrically connected to the ground. The phase voltage V1 becomes 0 V.

<Phase Signal>

The phase signal S21 is generated through comparison between the phase voltage V1 and the zero-cross reference voltage Vzs.

At about −30 degrees, the phase signal S21 generates an H-level pulse which indicates a positive spike voltage, and is change from an L-level to the H-level at about 0 degrees. At about 150 degrees, the period of the phase signal S21 becomes an L-level by the negative spike voltage, and then is changed from the H-level to the L-level at about 180 degrees.

The drive signal Vvu turns on the switching element Q3 at about 150 degrees, and turns off at about 270 degrees.

The drive signal Vv1 turns off the switching element Q4 at about 90 degrees, and turns on at about 330 degrees.

By turning-off of the drive signal Vv1 at about 90 degrees, the V phase is opened from the ground. The positive spike voltage is generated in the phase voltage V2. Thereafter, the phase voltage V2 rises to match with the zero-cross reference voltage Vzs at about 120 degrees, and is saturated at about 150 degrees.

By turning-on of the drive signal Vvu at about 150 degrees, the power supply voltage Vcc of the DC power source Vd is applied to the V phase. The phase voltage V2 becomes the power supply voltage Vcc.

By turning-off of the drive signal Vvu at about 270 degrees, the V phase is opened from the positive electrode of the DC power source Vd. The negative spike voltage is generated in the phase voltage V2. Thereafter, the phase voltage V2 descends to match with the zero-cross reference voltage Vzs at about 300 degrees, and reaches 0 V at about 330 degrees.

By turning-on of the drive signal Vv1 at about 330 degrees, the V phase is conductive to the ground. The phase voltage V2 becomes 0 V.

The phase signal S22 is generated through comparison between the phase voltage V2 and the zero-cross reference voltage Vzs.

The phase signal S22 generates an H-level pulse which indicates a positive spike voltage at about 90 degrees, and is changed from an L-level to the H-level at about 120 degrees. At about 270 degrees, the period of the phase signal S22 becomes the L-level by the negative spike voltage, and then is changed from the H-level to the L-level at about 300 degrees.

The drive signal Vwu turns off the switching element Q5 at about 30 degrees, and turns on at about 270 degrees.

The drive signal Vw1 turns on the switching element Q5 at about 90 degrees, and turns off at about 210 degrees.

By turning-off of the drive signal Vwu at about 30 degrees, the W phase is opened from the positive electrode of the DC power source Vd. The negative the spike voltage is generated in the phase voltage V3. Thereafter, the phase voltage V3 descends to match with the zero-cross reference voltage Vzs at about 60 degrees, and reaches 0 V at about 90 degrees.

By turning-on of the drive signal Vw1 at about 90 degrees, the W phase is conductive to the ground. The phase voltage V3 becomes 0 V.

By turning-off of the drive signal Vw1 at about 210 degrees, the W phase is opened from the ground. The positive spike voltage is generated in the phase voltage V3. Thereafter, the phase voltage V3 rises to match with the zero-cross reference voltage Vzs at about 240 degrees, and is saturated at about 270 degrees.

By turning-on of the drive signal Vwu at about 270 degrees, the power supply voltage Vcc of the DC power source Vd is applied to the W phase. The phase voltage V3 matches with the power supply voltage Vcc.

The phase signal S23 is generated through comparison between the phase voltage V3 and the zero-cross reference voltage Vzs.

The phase signal S23 generates an L-level pulse which indicates the negative spike voltage at about 30 degrees, and is changed from an H-level to the L-level at about 60 degrees. At about 210 degrees, the period of the phase signal S23 becomes the H-level by the positive spike voltage, and then is changed from the L-level to the H-level at about 240 degrees.

<Position Detection Signal>

As illustrated in FIG. 3, the position detection signal Sp generates the positive H-level pulse at about 0 degrees, about 120 degrees, about 240 degrees, and about 360 degrees. When the positive spike voltage is generated in the phase voltages V1, V2, and V3, and then, the voltage rises to exceed the zero-cross reference voltage Vzs, the positive H-level pulse is generated in the position detection signal Sp.

<Selection of Position Detection Signal>

In a case where the rotational speed is equal to or more than the predetermined rotational speed, based on the rotational speed information S4, the energization switching control circuit 431 of the selection circuit 43 switches the selection signal S5 from the position detection signal Sp of the sensorless driving to the hall signal Sh, and outputs the switched signal.

Herein, a rotational speed in which the zero cross timing and rising edge of the hall signal Sh have the same timing is measured in advance, and at the rotational speed, the sensorless driving is switched to the one-sensor driving.

FIG. 4 is a flowchart illustrating a process of control to switch between the position detection signal Sp of the sensorless driving and the hall signal Sh (rotor position signal) of the one hall sensor Hw depending on the rotational speed. The controller 4 of the drive control device 1 performs the control illustrated in FIG. 4.

In step S30, the rotational speed determination unit 41 (see FIG. 1) of the controller 4 detects the rotational speed of the rotor based on the phase voltage.

In step S31, the rotational speed determination unit 41 determines whether the detected rotational speed is larger than a predetermined threshold value. When the detected rotational speed is equal to or less than the predetermined threshold value (case of NO), the process proceeds to step S32. When the detected rotational speed is larger than the predetermined threshold value (case of YES), the process proceeds to step S33.

A case where the detected rotational speed is equal to or smaller than the predetermined threshold value (case of NO in step S31) is a case of the normal operation (low-speed rotation). In this case, the controller 4 performs the sensorless driving based on the position detection signal Sp in step S32, and the process of FIG. 4 is completed. Specifically, the selection circuit 43 of the controller 4 selects the position detection signal Sp, and outputs the position detection signal Sp as the selection signal S5 to the energization signal generator 42.

A case where the detected rotational speed is larger than the predetermined threshold value (case of YES in step S31) is a case of a high-speed rotation. In this case, the controller 4 generates the drive control signal Sc in step S33, based on the hall signal Sh (rotor position signal) output from the one hall sensor Hw, and the process of FIG. 4 is completed. Specifically, the selection circuit 43 of the controller 4 selects the hall signal Sh, and outputs the hall signal Sh as the selection signal S5 to the energization signal generator 42.

According to this control, the drive control device 1 of the motor 20 can perform control to synchronize with a phase having the optimum advance angle depending on the rotational speed. Thus, the step-out does not occur even in the high-speed rotation.

As described above, the drive control device 1 of the motor 20 of this embodiment includes the one hall sensor Hw provided in a position where the timing of the rising edge or the falling edge of the rotor position signal is near the zero cross timing of a phase signal of any phase, and the controller 4 which generates the drive control signal Sc based on the phase signals S21 to S23 of the respective phase coils in a case where the rotational speed is less than the predetermined rotational speed, and generates the drive control signal Sc based on the rotor position signal output from the one hall sensor Hw in a case where the rotational speed is equal to or more than the predetermined rotational speed.

With such a configuration, the drive control device 1 switches over to the one-sensor driving when the actual number of revolutions (obtained from the phase signal) is the number of revolutions (a predetermined number of revolutions) obtained and stored in advance by an experiment and the like. Thus, in a case where the rotational speed is equal to or more than the predetermined rotational speed, the sensorless driving is switched to the one-sensor driving before the zero-cross reference voltage Vzs and the phase voltages V1 to V3 come to be a non-cross state, and thus the step-out does not occur. According to a demonstration experiment of the present inventors, it has been confirmed that the configuration, in which the step-out has occurred in less than 30000 revolutions per one minute, does not cause the step-out even in 30000 revolutions or more.

In this embodiment, the one hall sensor Hw is provided in a position near the zero cross timing of the phase signal of any phase (that is, a position to be synchronized with the edge of zero-cross detection timing at the time of falling or rising of any phase). Accordingly, since the sensorless driving and the one-sensor driving can be controlled by the control flow of the same firmware, a code size (program size) is suppressed to be small.

As a supplementary description, since an energization switching timing is calculated from the zero-cross detection timing in the control of the sensorless driving, a large amount of code is consumed in the calculation. In a case where the one hall sensor Hw is not provided in the above position, a code for calculating the energization switching timing is newly required to use the one hall sensor Hw, and thus the amount of code is increased. For this reason, an inexpensive microcomputer lacks flash memory.

Contrary, in this embodiment, the rising edge or the falling edge of the output of the one hall sensor Hw matches with the zero cross timing by providing the one hall sensor Hw on the above-described position. Accordingly, a calculating method in the sensorless driving and a calculating method in the one-sensor driving are the same, and thus the energization switching timing can be created by the same calculating method.

Second Embodiment

In the first embodiment, the zero-cross reference voltage Vzs is set to be easy to start up in sensorless, and, in a case where the rotational speed is equal to or more than the predetermined rotational speed, control to switch from the sensorless driving to the one-sensor driving is preformed. Thus, it is possible to normally start up and to realize the low-speed rotation, and the drive control device in which the step-out hardly occurs even in the high-speed rotation can be realized.

In the second embodiment, the determination of switching from the sensorless driving to the one-sensor driving is obtained not from the rotational speed but from a relation between a rotor position information and the phase signal (the timing of the rising edge or the falling edge of the rotor position information is in the predetermined period within an open period of the back electromotive voltage).

Figure 5:
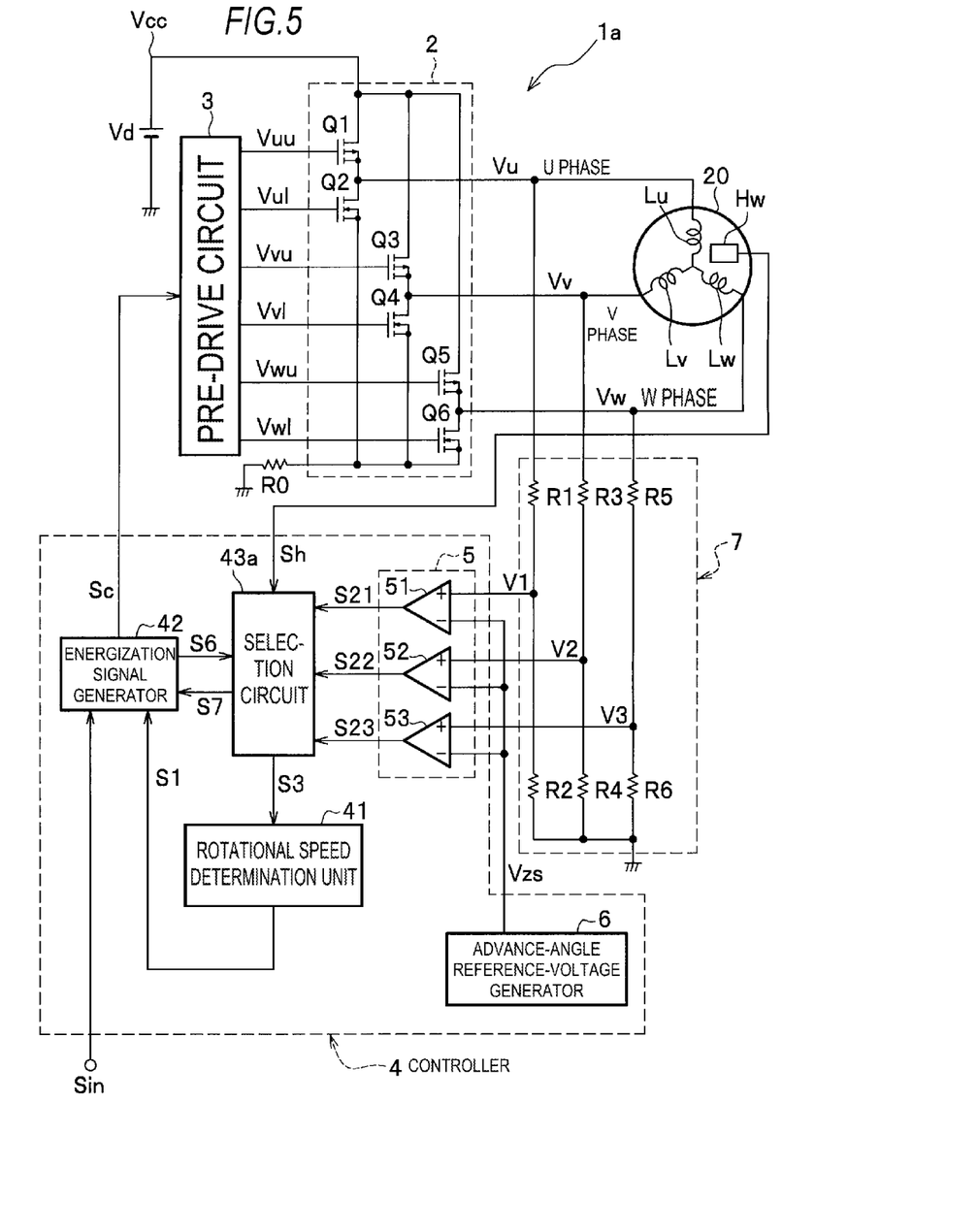
FIG. 5 is a block diagram illustrating a circuit configuration of a motor drive control device according to a second embodiment.

FIG. 5 is a block diagram illustrating a circuit configuration of the drive control device 1a of the motor 20 in the second embodiment. The same components as in FIG. 1 are represented by the same reference numerals and the redundant description will be omitted.

The drive control device 1a of the motor 20 (an example of the motor drive control device) includes the inverter circuit 2 and the pre-drive circuit 3 which drive the motor 20, the back electromotive voltage detector 7, and the controller 4 which outputs the drive control signal Sc to the motor driver.

When the timing of the rising edge or the falling edge of the hall signal Sh (rotor position signal) is in a predetermined range of the open period of the back electromotive voltage, the controller 4 of the drive control device 1a in the second embodiment switches a signal for generating the drive control signal Sc from the phase signal to the hall signal Sh. As a specific example, when the timing of the rising edge or the falling edge of the hall signal Sh almost matches with the center of the open period of the back electromotive voltage, the controller 4 switches a signal for generating the drive control signal Sc from the phase signal to the rising edge of the hall signal Sh. As another specific example, when the timing of the rising edge of the hall signal Sh almost matches with the zero cross timing of the back electromotive voltage, the controller 4 switches a signal for generating the drive control signal Sc from the phase signal to the hall signal Sh. The switching may be performed in the falling edge of the hall signal Sh.

The controller 4 includes the advance-angle reference-voltage generator 6 which generates the zero-cross reference voltage Vzs, the back-electromotive-voltage comparator 5 which generates the phase signal of the respective phases by the cross timing (zero cross timing) between the zero-cross reference voltage Vzs and the back electromotive voltage of the each phase coil, the rotational speed determination unit 41 which inputs the phase signals of the respective phases and outputs the rotational speed information S4, the energization signal generator 42 which generates the drive control signal Sc based on the selection information S7 output from a selection circuit 43a, and the selection circuit 43a which switches between the position detection signal Sp and the hall signal Sh based on the relation between the hall signal Sh (rotor position information) and the phase signal.

The selection circuit 43a outputs the detection signal S3 (position detection signal Sp or hall signal Sh) to the rotational speed determination unit 41. The selection circuit 43a selects any one of the position detection signal Sp or the hall signal Sh depending on energization switching timing information S6 (information such as open period) from the energization signal generator 42, and outputs the selected one as a selection information S7 added with energization switching information.

Figure 6:
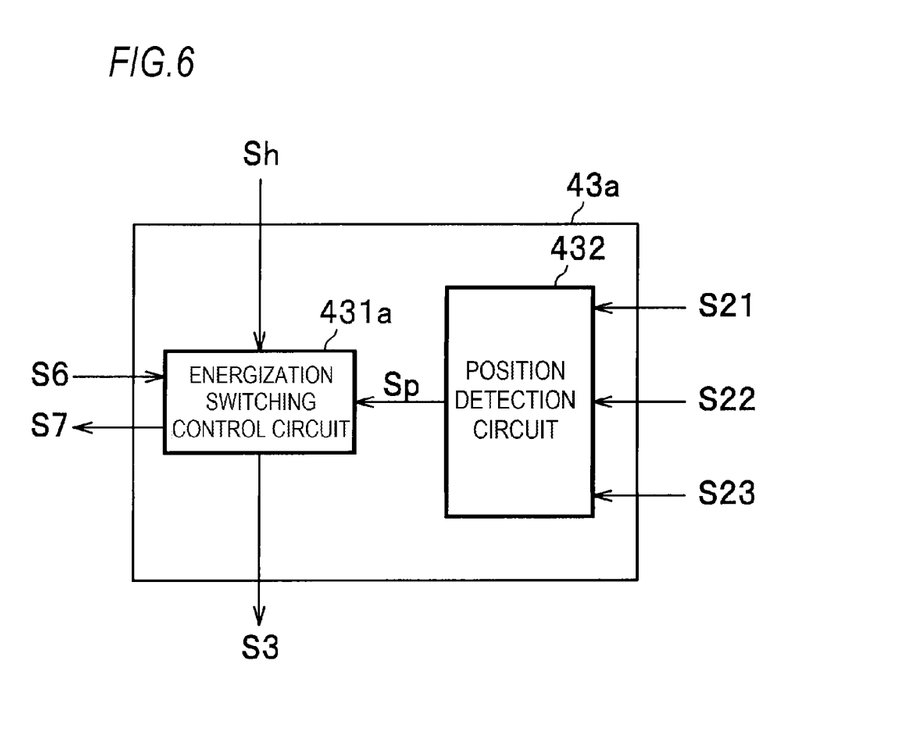
FIG. 6 is a circuit configuration diagram of a selection circuit of the motor drive control device according to the second embodiment.

FIG. 6 is a circuit configuration diagram of the selection circuit 43a. The same components as in FIG. 2 are represented by the same reference numerals and the redundant description will be omitted.

As illustrated in FIG. 6, the selection circuit 43a includes an energization switching control circuit 431a, and the position detection circuit 432.

The energization switching control circuit 431a determines the switching timing from the sensorless driving to the one-sensor driving based on the position detection signal Sp, the hall signal Sh, and the energization switching timing information S6 (information such as open period Tm), and outputs selection information S7. The selection information S7 includes the detection signal and the energization switching information.

Figure 7:
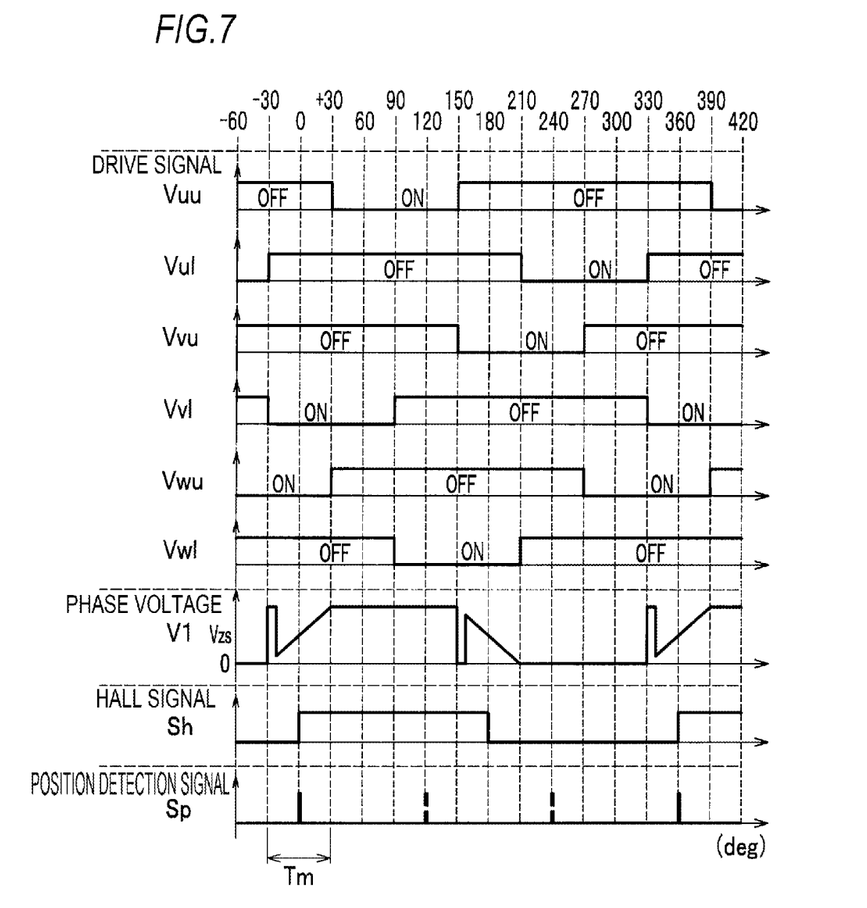
FIG. 7 is a timing chart illustrating an operation waveform of each part of the motor drive control device according to the second embodiment.

FIG. 7 is a timing chart illustrating the operation waveform of each part of the drive control device 1a. The same components as in the timing chart of FIG. 3 are represented by the same reference numerals.

The time difference between the time of the open period (above-described measured period), and the rising edge of the hall signal Sh and the position detection signal Sp is measured. The timing to switch from the sensorless driving to the one-sensor driving is determined based on such a relation. Specifically, in a case where the time difference between the rising edge (see the hall signal Sh of FIG. 7) of the hall signal Sh and the position detection signal Sp is smaller than the open period (see Tm of FIG. 7), the energization switching control circuit 431a switches over to the one-sensor driving when the rising edge of the hall signal Sh matches with the zero cross timing of the phase voltage V1.

In a case where the time difference between the rising edge of the hall signal Sh and the position detection signal Sp is larger than the open period, switching to the one-sensor driving is performed when the rising edge of the hall signal Sh is in a predetermined time in the open period (see Tm of FIG. 7) of the phase voltage V1 which is set in advance in consideration of such a difference.

The position detection signal Sp indicated by the solid line of FIG. 7 is a position detection signal generated through comparison between the phase voltage V1 and the zero-cross reference voltage Vzs. The position detection signal Sp indicated by the broken line of FIG. 7 is an estimated position of the position detection signal Sp in the V phase and the W phase.

Figure 8:
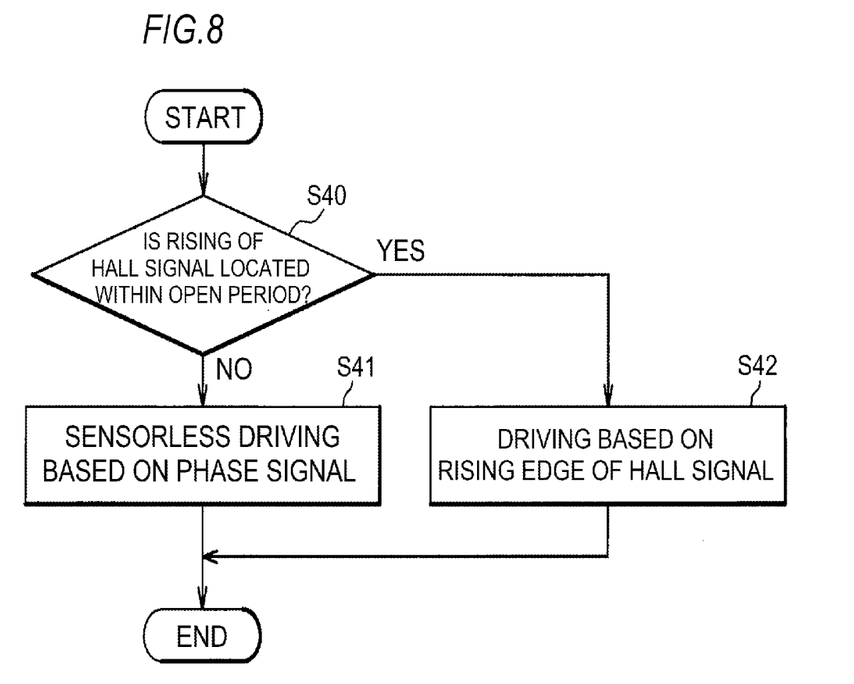
FIG. 8 is a flowchart illustrating control to switch between the position detection signal and the hall signal from a relation between rotor position information and a phase signal of the motor drive control device according to the second embodiment.

FIG. 8 is a flowchart illustrating a process of control to switch between the position detection signal Sp and the hall signal Sh based on the relation between the rotor position information and the phase signal. The controller 4 of the drive control device 1a performs the control illustrated in FIG. 8.

In step S40, the energization signal generator 42 (see FIG. 5) of the controller 4 determines whether the rising edge of the hall signal Sh is within the open period (see Tm of FIG. 7).

When the rising edge of the hall signal Sh is not within the open period (see Tm of FIG. 7) (case of NO), the process proceeds to step S41. When the rising edge of the hall signal Sh is within the open period (case of YES), the process proceeds to step S42.

The rotor position signal is not within the open period (case of NO in step S40) at the normal operation (non high-speed rotation). In such a case, the controller 4 performs the sensorless driving in step S41 based on the position detection signal Sp, and the process of FIG. 8 is completed. Specifically, the selection circuit 43a of the controller 4 selects the position detection signal Sp, and outputs the corresponding position detection signal Sp as the selection signal S5 to the energization signal generator 42.

The rotor position signal is within the open period (case of YES in step S40) during an operation to generate the preset back electromotive voltage. In this case, the controller 4 generates the drive control signal Sc in step S42, based on the rising edge of the hall signal Sh (rotor position signal) output from the one hall sensor Hw, and the process of FIG.

8 is completed. Specifically, the selection circuit 43a of the controller 4 selects the hall signal Sh, and outputs the hall signal Sh as the selection information S7 to the energization signal generator 42.

With such control, the drive control device 1a of the motor 20 can perform control to synchronize with a phase having the optimum advance angle depending on the rotational speed. Thus, the step-out does not occur.

Figure 9:
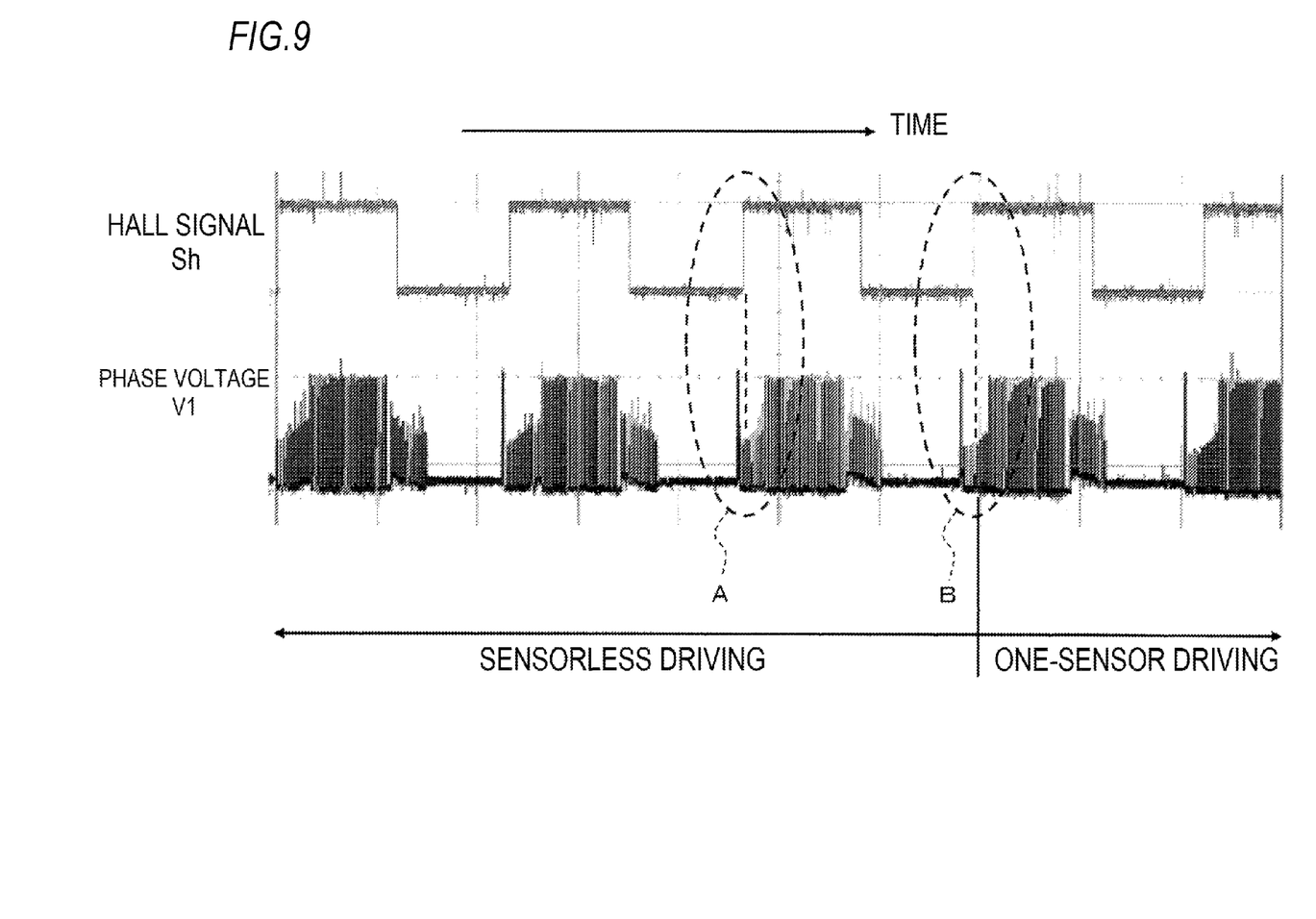
FIG. 9 is a waveform diagram with respect to determination on the timing of switching from the sensorless driving of the motor drive control device to one-sensor driving according to the second embodiment.

FIG. 9 is a waveform diagram with respect to determination on the timing of switching from the sensorless driving to the one-sensor driving, and illustrates an example of performing determination in the rising edge of a sensor signal.

As illustrated in FIG. 9, when the rising edge of the hall signal Sh is measured within a predetermined period of the open period of the phase voltage V1, the energization switching control circuit 431a switches over to sensor driving (sensor mode) using the one hall sensor Hw.

In an example of FIG. 9, the rising edge of the hall signal Sh is switched at the timing of the center of the open period. A portion A enclosed by the broken line of FIG. 9 means a state where switching to the sensor mode is not performed yet, and a portion B enclosed by the broken line of FIG. 9 means a state where switching to the sensor mode is performed.

In this manner, the controller 4 of the drive control device 1a in this embodiment obtains a predetermined number of revolutions based on the relation between the rotor position signal and the phase signal of the each phase coil. Specifically, when the timing of the rising edge or the falling edge of the hall signal Sh is within the predetermined range of the open period (see Tm of FIG. 7) of the back electromotive voltage, the controller 4 determines that the number of revolutions of the motor 20 reaches the predetermined number of revolutions, and switches a signal from generating the drive control signal Sc from the phase signal to the hall signal Sh (rotor position signal). More specifically, when the timing of the rising edge or the falling edge of the hall signal Sh (rotor position signal) almost matches with the center of the open period of the back electromotive voltage, the controller 4 may switch the signal for generating the drive control signal Sc from the phase signal to the hall signal Sh. By performing the switching when the timing of the rising edge or the falling edge of the hall signal Sh is in the center of the open period of the back electromotive voltage, the deviation from the phase signal becomes small, and the switching can be smoothly performed.

When the timing of the rising edge or the falling edge of the hall signal Sh almost matches with the zero cross timing of the back electromotive voltage, the controller 4 may switch a signal for generating the drive control signal Sc from the phase signal to the hall signal Sh.

As described above, when the timing of the rising edge or the falling edge of the hall signal Sh is within the predetermined range of the open period (see Tm of FIG. 7) of the back electromotive voltage, the controller 4 switches a signal for generating the drive control signal Sc from the phase signal to the hall signal Sh (rotor position signal). Therefore, the low-speed rotation can be realized regardless of the rotational speed, and the drive control device in which the step-out hardly occurs even in the high-speed rotation can be realized.

Modification Example

This disclosure is not limited to the above-described embodiments, and may be modified without departing from the spirit and scope of the invention, for example, as following (a) to (i).

(a) In the above-described embodiments, any one of the one-sensor driving or the sensorless driving may be used at the time of start-up. In the case of starting up in the sensorless driving, the zero-cross reference voltage is designed to a voltage in which it is easy to start up in the sensorless driving. After the starting up in the sensorless driving, the one-sensor driving is used to start up at the time of the high-speed rotation.

(b) The switching of the phase for synchronizing in the above-described embodiments is not limited to the actual rotational speed, and may be determined based on winding voltage, winding current, the combination thereof, and the like. Accordingly, the switching can be performed at an optimum timing.

(c) At least some portions of components of the drive control device 1 or 1a may be processed not by hardware, but by software.

(d) The motor 20 is not limited to a three-phase brushless motor, and may be another kind of motor. The number of phases of the motor 20 is not limited to three.

(e) The driving system of the motor 20 is not limited to the sinusoidal wave driving system, and may be a rectangular wave driving system, for example.

(f) At least some portion of the drive control device 1 may be an integrated circuit (IC).

(g) The circuit block configuration of the selection circuit 43 illustrated in FIG. 2 and the selection circuit 43a illustrated in FIG. 6 is merely a specific example, and is not limited thereto.

(h) The control sequence illustrated in FIGS. 4 and 8 is merely an example, and is not limited to these process steps. For example, another process may be inserted between the steps.

(i) The predetermined zero-cross reference voltage Vzs corresponding to each rotational speed of the motor 20 may set to an appropriate value based on, for example, a theory and the actual measurement result, and then may be stored in a storage unit (not illustrated). The value of the zero-cross reference voltage Vzs corresponding to each rotational speed of the motor 20 may be stored in the storage unit.

What is claimed is:

1. A motor drive control device that drives a motor including a plurality of phase coils and a rotor rotatably supported with respect to the plurality of phase coils, the motor drive control device comprising:
a motor driver, which outputs a drive signal to each of the phase coils of the motor based on a drive control signal;
one position sensor, which is provided in a position where a timing of at least one of a rising edge and a falling edge of a rotor position signal is near a zero cross timing of a phase signal of any phase coil; and
a controller that:
generates the drive control signal based on the phase signal of the any phase coil in a case where a rotational speed of the motor is less than a predetermined rotational speed;
generates the drive control signal based on the rotor position signal output from the one position sensor in a case where the rotational speed is equal to or more than the predetermined rotational speed; and
wherein the controller includes a rotational speed determination unit, wherein the rotational speed determination unit:
obtains an actual number of revolutions of the motor based on the phase signal of the each phase coil; and
calculates the predetermined rotational speed from a comparison result between a predetermined number of revolutions, at which switching from the phase signal to the rotor position signal is performed, and the actual number of revolutions.

2. A motor drive control device that drives a motor including a plurality of phase coils and a rotor rotatably supported with respect to the plurality of phase coils, the motor drive control device comprising:

a motor driver, which outputs a drive signal to each of the phase coils of the motor based on a drive control signal;

one position sensor, which is provided in a position where a timing of at least one of a rising edge and a falling edge of a rotor position signal is near a zero cross timing of a phase signal of any phase coil; and a controller that:

generates the drive control signal based on the phase signal of the any phase coil in a case where a rotational speed of the motor is less than a predetermined rotational speed;

generates the drive control signal based on the rotor position signal output from the one position sensor in a case where the rotational speed is equal to or more than the predetermined rotational speed; and wherein the controller includes a rotational speed determination unit, wherein the rotational speed determination unit obtains the predetermined rotational speed from a relation between the rotor position signal and the phase signal of the each phase coil.

3. The motor drive control device according to claim 2, wherein the controller switches a signal for generating the drive control signal from the phase signal to the rotor position signal when the timing of the at least one of the rising edge and the falling edge of the rotor position signal is located within a predetermined range of an open period of a back electromotive voltage.

4. The motor drive control device according to claim 3, wherein the controller switches the signal for generating the drive control signal from the phase signal to the rotor position signal when the timing of the at least one of the rising edge and the falling edge of the rotor position signal substantially matches with a center of the open period of the back electromotive voltage.

5. The motor drive control device according to claim 3, wherein the controller switches the signal for generating the drive control signal from the phase signal to the rotor position signal when the timing of at least one of the rising edge and the falling edge of the rotor position signal substantially matches with a zero cross timing of the back electromotive voltage.

* * * * *